(12) United States Patent
Hagiwara

(10) Patent No.: US 9,325,784 B2
(45) Date of Patent: *Apr. 26, 2016

(54) DEVICE MANAGEMENT DEVICE AND RECORDING MEDIUM

(71) Applicant: RICOH COMPANY, LTD., Tokyo (JP)

(72) Inventor: Kenji Hagiwara, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/620,314

(22) Filed: Feb. 12, 2015

(65) Prior Publication Data

US 2015/0156258 A1 Jun. 4, 2015

Related U.S. Application Data

(63) Continuation of application No. 14/161,844, filed on Jan. 23, 2014, now Pat. No. 8,982,400, which is a continuation of application No. 13/226,085, filed on Sep. 6, 2011, now Pat. No. 8,675,214.

(30) Foreign Application Priority Data

Sep. 16, 2010 (JP) .................................. 2010-208217
Jul. 26, 2011 (JP) .................................. 2011-163351

(51) Int. Cl.
*G06F 15/00* (2006.01)
*G06F 3/12* (2006.01)
(Continued)

(52) U.S. Cl.
CPC .............. *H04L 67/10* (2013.01); *G06F 3/1293* (2013.01); *G06Q 10/06* (2013.01); *H04L 41/0813* (2013.01); *H04L 41/0853* (2013.01); *H04N 1/00278* (2013.01); *H04N 1/00344* (2013.01);
(Continued)

(58) Field of Classification Search
USPC .................................................. 358/1.1–1.18
See application file for complete search history.

(56) References Cited

U.S. PATENT DOCUMENTS

| 6,876,922 | B2 | 4/2005 | Nagaki |
| 8,281,993 | B2 | 10/2012 | Sauerwein, Jr. et al. |
| 8,675,214 | B2 | 3/2014 | Hagiwara |
| 2008/0158596 | A1* | 7/2008 | Kadota .......................... 358/1.15 |
| 2008/0235273 | A1* | 9/2008 | Shipilevsky .............. 707/103 Y |

FOREIGN PATENT DOCUMENTS

| JP | H09-512369 | 12/1997 |
| JP | 2004-165813 | 6/2004 |

(Continued)

OTHER PUBLICATIONS

Japanese Office Action dated Oct. 6, 2015.

*Primary Examiner* — Douglas Tran
(74) *Attorney, Agent, or Firm* — IPUSA, PLLC

(57) ABSTRACT

A device management apparatus is connected to a device and an asset management device via a network. The device management apparatus includes a processor that executes steps of: acquiring a device information of the device via the network in accordance with a communication protocol that suits for the device; detecting at least one event concerning installation, movement, addition, change, or disposal with respect to the device based on the acquired information and internal information stored in the device management apparatus; transforming both identification information of the device and device information corresponding to the one of the events detected into data that enables the asset management device to manage the data; and transmitting transformed data to the asset management device via the network.

8 Claims, 12 Drawing Sheets

(51) Int. Cl.
    *G06K 1/00*     (2006.01)
    *H04L 29/08*     (2006.01)
    *G06Q 10/06*     (2012.01)
    *H04L 12/24*     (2006.01)
    *H04N 1/00*     (2006.01)

(52) U.S. Cl.
    CPC   *H04N 2201/0039* (2013.01); *H04N 2201/0082* (2013.01); *H04N 2201/0094* (2013.01)

(56) References Cited

FOREIGN PATENT DOCUMENTS

| | | |
|---|---|---|
| JP | 2006-201865 | 8/2006 |
| JP | 2009-169580 | 7/2009 |
| JP | 2009-199210 | 9/2009 |
| JP | 2009-301217 | 12/2009 |
| WO | 96/12249 | 4/1996 |
| WO | 2006/090460 | 8/2006 |

* cited by examiner

FIG.5

(A) DEVICE BASIC INFORMATION

| ITEM | DESCRIPTION |
|---|---|
| DEVICE ID | IDENTIFIER OF DEVICE |
| MAC ADDRESS | MAC ADDRESS OF NETWORK DEVICE RELATED TO DEVICE |
| MODEL NAME | MODEL NAME OF DEVICE |
| SERIAL NUMBER | SERIAL NUMBER OF DEVICE |
| IP ADDRESS | IP ADDRESS OF DEVICE |
| PLACE INFORMATION | PLACE INFORMATION OF DEVICE |
| FIRST DISCOVERY DATE/TIME | FIRST DISCOVERY DATE/TIME OF DEVICE |
| OPTION ID | ID TO ACCESS RECORD OF OPTION INFO. OF DEVICE |
| APPLICATION ID | ID TO ACCESS RECORD OF APPL. INFO. OF DEVICE |
| SETTING ID | ID TO ACCESS RECORD OF SETUP INFO. OF DEVICE |
| FIRMWARE ID | ID TO ACCESS RECORD OF FIRMWARE INFO. OF DEVICE |
| DISPOSAL DATE/TIME | DATE/TIME OF DISPOSAL OF DEVICE |

(B) OPTION INFORMATION

| ITEM | DESCRIPTION |
|---|---|
| OPTION ID | IDENTIFIER OF OPTION |
| OPTION NAME | NAME OF OPTION |
| OPTION VERSION | VERSION OF OPTION |
| OPTION SERIAL NUMBER | SERIAL NUMBER OF OPTION |
| OPTION COMMENT | COMMENTS ON OPTION |

(C) APPLICATION INFORMATION

| ITEM | DESCRIPTION |
|---|---|
| APPLICATION ID | IDENTIFIER OF APPLICATION |
| APPLICATION NAME | NAME OF APPLICATION |
| APPLICATION VERSION | VERSION OF APPLICATION |
| APPL. SERIAL NUMBER | SERIAL NUMBER OF APPLICATION |
| APPL. COMMENT | COMMENTS ON APPLICATION |

(D) SETUP INFORMATION

| ITEM | DESCRIPTION |
|---|---|
| SETTING ID | IDENTIFIER OF SETUP ITEM |
| SETTING NAME | NAME OF SETUP ITEM |
| SETTING VALUE | SETTING VALUE |

(E) FIRMWARE INFORMATION

| ITEM | DESCRIPTION |
|---|---|
| FIRMWARE ID | IDENTIFIER OF FIRMWARE |
| FIRMWARE NAME | NAME OF FIRMWARE |
| FIRMWARE VERSION | VERSION OF FIRMWARE |
| FIRMWARE COMMENT | COMMENTS ON FIRMWARE |

FIG.6

| SERIAL NUMBER | PURCHASE DATE | INSTALLATION DATE | PURCHASE PRICE | PERSON IN CHARGE | PLACE | ... | DISPOSAL DATE/TIME |
|---|---|---|---|---|---|---|---|
| 123 | 2010/4/5 | 2010/4/8 | ○YEN | AA | X | ... | |
| 456 | 2010/4/9 | 2010/5/1 | △YEN | BB | Y | ... | |
| 789 | 2010/7/8 | 2010/7/9 | □YEN | CC | Z | ... | |
| ... | ... | | ... | | ... | ... | ... |

FIG.7

| SERIAL NUMBER | IP ADDRESS | MODEL NAME | OPTION ID | ... |
|---|---|---|---|---|
| 123 | 1 | M-a | 1,2 | ... |
| 456 | 2 | M-b | 2 | ... |
| 789 | 3 | M-c | | ... |
| ... | ... | ... | ... | ... |

FIG.8

| OPTION ID | OPTION NAME | OPTION VERSION |
|---|---|---|
| 1 | opA | 1.1 |
| 2 | opB | 1.1 |
| 3 | opC | 1.1 |
| ⋮ | ⋮ | ⋮ |

FIG.9

```
Device
    —Serial  : 123
    —IP      : 1
    —model   : M-a
        ⋮
```

FIG.10

```
<Device>
    <SerialNumber>123</SerialNumber>
    <IPaddress>1</IPaddress>
    <modelName>M-a</modelName>
        ⋮
</Device>
```

DEVICE MANAGEMENT DEVICE AND RECORDING MEDIUM

CROSS-REFERENCE TO RELATED APPLICATION

This application is a continuation patent application of U.S. patent application Ser. No. 14/161,844 filed on Jan. 23, 2014, which is based on and claims the benefit of priority of a continuation patent application of U.S. patent application Ser. No. 13/226,085 filed on Sep. 6, 2011, which is based upon and claims the benefit of priority of Japanese patent application No. 2010-208217, filed on Sep. 16, 2010, and Japanese patent application No. 2011-163351, filed on Jul. 26, 2011, the contents of which are incorporated herein by reference in their entirety.

BACKGROUND OF THE INVENTION

1. Field of the Invention

The present disclosure relates to a device management device and a recording medium which are adapted to manage devices on a network.

2. Description of the Related Art

In recent years, the demand for IT (information technology) asset management in corporations is increasing from a viewpoint of legal regulation and cost reduction. An increasing number of corporations manage not only PC (personal computers) or software, but also network devices, such as MFP (multifunction peripherals) or LP (laser printers), as a part of the IT assets.

Although a large number of asset management support tools (asset management systems) to automate the management of the PC or software have been developed, there is no adequate management support tool for automating the management of the MFP or LP. The actual situation of most of the corporations is that an asset book is created and managed by using a guidance manual in order to perform the management of the MFP or LP.

For example, Japanese Laid-Open Patent Publication No. 2009-301217 discloses an asset management support processing system. In this asset management support processing system, when an approved application for use of an asset management object is detected, an application ID is acquired. An asset ID is added to each approved device. Specifically, an asset serial number that is common to a device associated with a same user ID and a device classification corresponding to a device code are added to an application ID, so that an asset ID is generated. A process of registration of an asset management ledger in a database and a process of transmission of a new delivery request are performed.

On the other hand, conventional device management support tools (software) which have been widely used in the related art are mainly aimed at automating searching of a device on a network, detection of an alert, and reception of a counter.

However, in the asset management support system according to the related art, a device management device that is capable of acquiring device information of devices on a network, and an asset management device that manages the devices on the network as IT assets are arranged independently of each other. Hence, even if the device management device is introduced into the asset management system including the asset management device, the asset management device is unable to use the information treated by the device management device. There is a problem in that the asset management system has difficulty in performing efficient asset management.

SUMMARY OF THE INVENTION

In one aspect, the present disclosure provides a device management device which is adapted to transmit information used for asset management to an asset management device and allow the asset management device to perform efficient asset management.

In an embodiment which solves or reduces one or more of the above-described problems, the present disclosure provides a device management apparatus connected to a device and an asset management device via a network, the device management apparatus including a processor that executes steps of: acquiring a device information of the device via the network in accordance with a communication protocol that suits for the device; detecting at least one event concerning installation, movement, addition, change, or disposal with respect to the device based on the acquired information and internal information stored in the device management apparatus; transforming both identification information of the device and device information corresponding to the one of the events detected into data that enables the asset management device to manage the data; and transmitting transformed data to the asset management device via the network.

In an embodiment which solves or reduces one or more of the above-described problems, the present disclosure provides an asset management device connected to a device management apparatus via a network, the asset management apparatus including a processor that executes steps of: acquiring from the device management device via the network, at least one of installation, movement, addition, change, and disposal events with respect to one of the devices and identification information of the one of the devices; updating asset information of asset registered in the asset management device according to the device information items corresponding to the at least one event and the identification information of the one of the devices, and managing updated asset information.

In an embodiment which solves or reduces one or more of the above-described problems, the present disclosure provides a system including: a first processor implemented on a device management apparatus connected to a device and an asset management device via a network, and a second processor implemented on a asset management apparatus connected to a device management apparatus via a network. The first processor executes steps of: acquiring a device information of the device via the network in accordance with a communication protocol that suits for the device; detecting at least one of events about installation, movement, addition, change, and disposal with respect to the device based on the acquired information and internal information stored in the device management apparatus; transforming both identification information of the device and device information corresponding to the one of the events detected into data that enables the asset management device to manage the data; and transmitting transformed data to the asset management device via the network. The second processor executes steps of: acquiring from the device management device via the network, at least one of installation, movement, addition, change, and disposal events with respect to one of the devices and identification information of the one of the devices; updating asset information of asset registered in the asset management device according to the device information items corresponding to the at least one event and the identification information of the one of the devices, and managing updated asset information.

In an embodiment which solves or reduces one or more of the above-described problems, the present disclosure provides a non-transitory computer-readable recording medium storing a program which, when executed by a computer, causes the computer to perform a device management method for use in a device management device that is connected to devices and an asset management device via a network, the asset management device arranged to manage assets of the devices on the network, the device management method including: acquiring, by an acquisition unit, a device information of one of the devices via the network in accordance with a communication protocol that conforms to the one of the devices; comparing, by a detection unit, the acquired device information with each of device information stored in a storage unit; detecting, by the detection unit, at least one of installation, movement, addition, change, and disposal events with respect to the one of the devices; transforming, by a transforming unit, both identification information of the one of the devices and device information corresponding to the at least one event detected by the detection unit into data that enables the asset management device to manage the data; and transmitting, by a transmission unit, the data from the transforming unit to the asset management device via the network.

In an embodiment which solves or reduces one or more of the above-described problems, the present disclosure provides a non-transitory computer-readable recording medium storing a program which, when executed by a computer, causes the computer to perform a device management method for use in a device management device that is connected to devices and an asset management device via a network, the asset management device arranged to manage assets of the devices on the network, the device management method including: acquiring, by an acquisition unit, a device information of one of the devices via the network in accordance with a communication protocol that conforms to the one of the devices; comparing, by a detection unit, the acquired device information with each of device information of the devices stored in a storage unit; detecting, by the detection unit, at least one of installation, movement, addition, change, and disposal events with respect to the one of the devices; and outputting, by an output unit, both identification information of the one of the devices and device information corresponding to the at least one event detected by the detection unit, to a transmission unit that transmits, to the asset management device via the network, data which is produced by transforming the identification information and the device information to enable the asset management device to manage the data.

Other objects, features and advantages of the present disclosure will become more apparent from the following detailed description when read in conjunction with the accompanying drawings.

BRIEF DESCRIPTION OF THE DRAWINGS

FIG. 5 is a diagram showing an example of device information stored in a device information database in the device management device of the first embodiment.

FIG. 6 is a diagram showing an example of asset information stored in an asset information database in an asset management device;

FIG. 7 is a diagram showing an example of device basic information.

FIG. 8 is a diagram showing an example of option information.

FIG. 9 is a diagram showing an example of a data structure of the information transmitted to a transforming unit in the device management device of the first embodiment.

FIG. 10 is a diagram showing an example of a data structure of the information transmitted to the asset management device.

DETAILED DESCRIPTION OF THE PREFERRED EMBODIMENTS

A description will be given of embodiments of the present disclosure with reference to the accompanying drawings.

Figure 1:
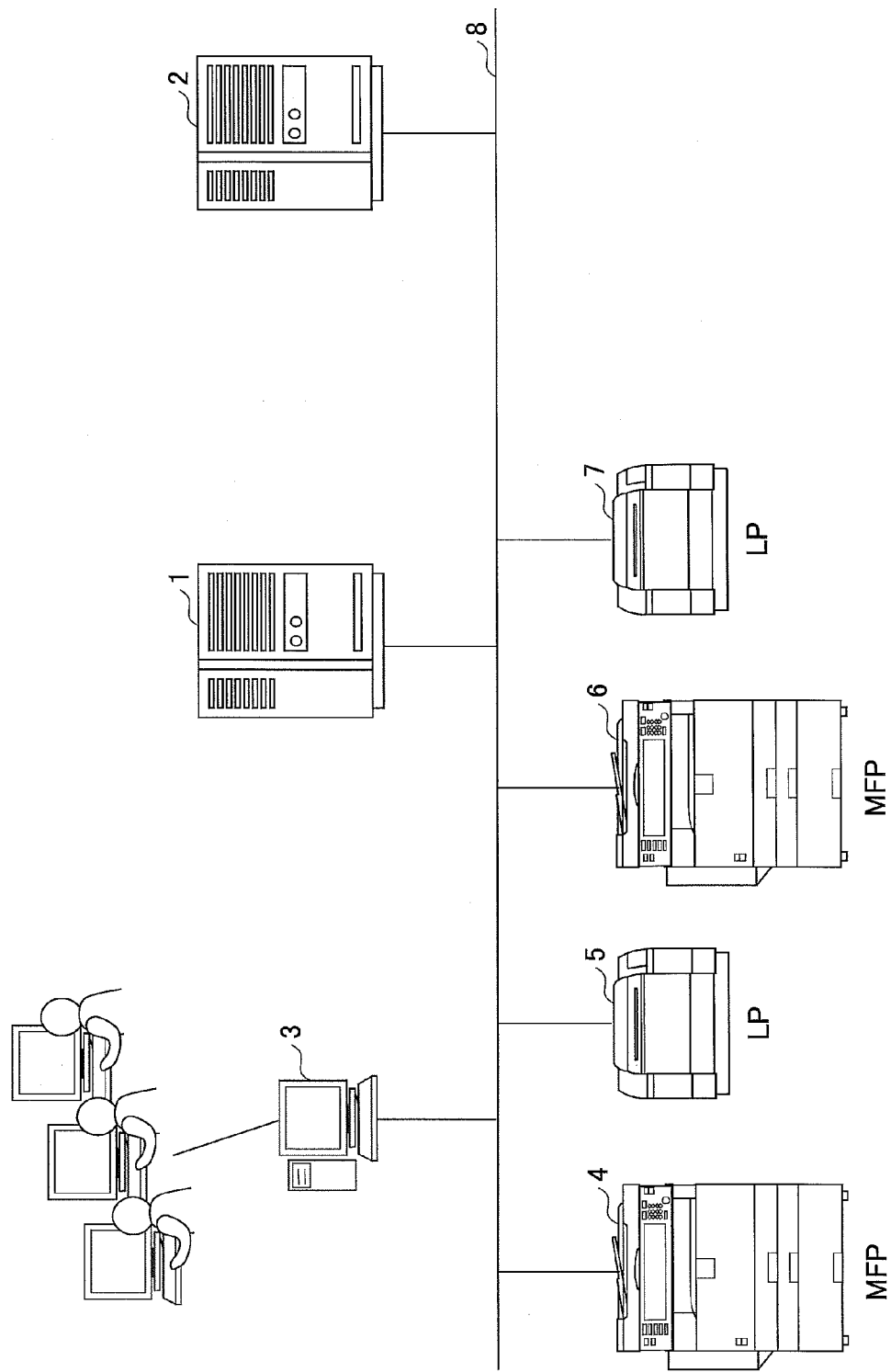
FIG. 1 is a diagram showing an example of a system to which a device management device of an embodiment of the present disclosure is applied.

FIG. 1 is a diagram showing an example of a system to which a device management device of an embodiment of the present disclosure is applied.

As shown in FIG. 1, this system includes a device management device 1, an asset management device 2, a client PC (personal computer) 3, an MFP (multifunction peripheral) 4, an LP (laser printer) 5, an MFP 6, and an LP 7, which are interconnected by a network 8. However, the present disclosure is not limited to the example shown in FIG. 1, and the kinds and the number of devices connected to the network in the system of the present disclosure may be arbitrary.

The device management device 1 performs a process of management of the devices connected to the network 8, a process of detection of IMACD (Install, Move, Add, Change, Disposal) events, and a process of transmission of a notice to an external device (the asset management device 2) via the network 8.

The asset management device 2 manages the assets such as the devices on the network 8. The asset management device 2 receives information from the device management device 1 via the network 8, and uses the received information for the asset management.

The client PC 3 is a personal computer that is used by a user, a system engineer (SE), or a help desk person. The client PC 3 uses a browser to access the device management device 1 and manages the devices on the network 8 in conjunction with the device management device 1. The client PC 3 uses the browser to access the asset management device 2 and manages the assets (asset management) in conjunction with the asset management device 2.

In the system of FIG. 1, the device management device 1 periodically receives device information from the device connected to the network 8, such as the MFP 4 or the LP 5, and manages the received device information. The device management device 1 transmits the information used for the asset management, to the asset management device 2.

Next, the hardware composition of a device management device 1 of a first embodiment of the present disclosure will be described.

Figure 2:
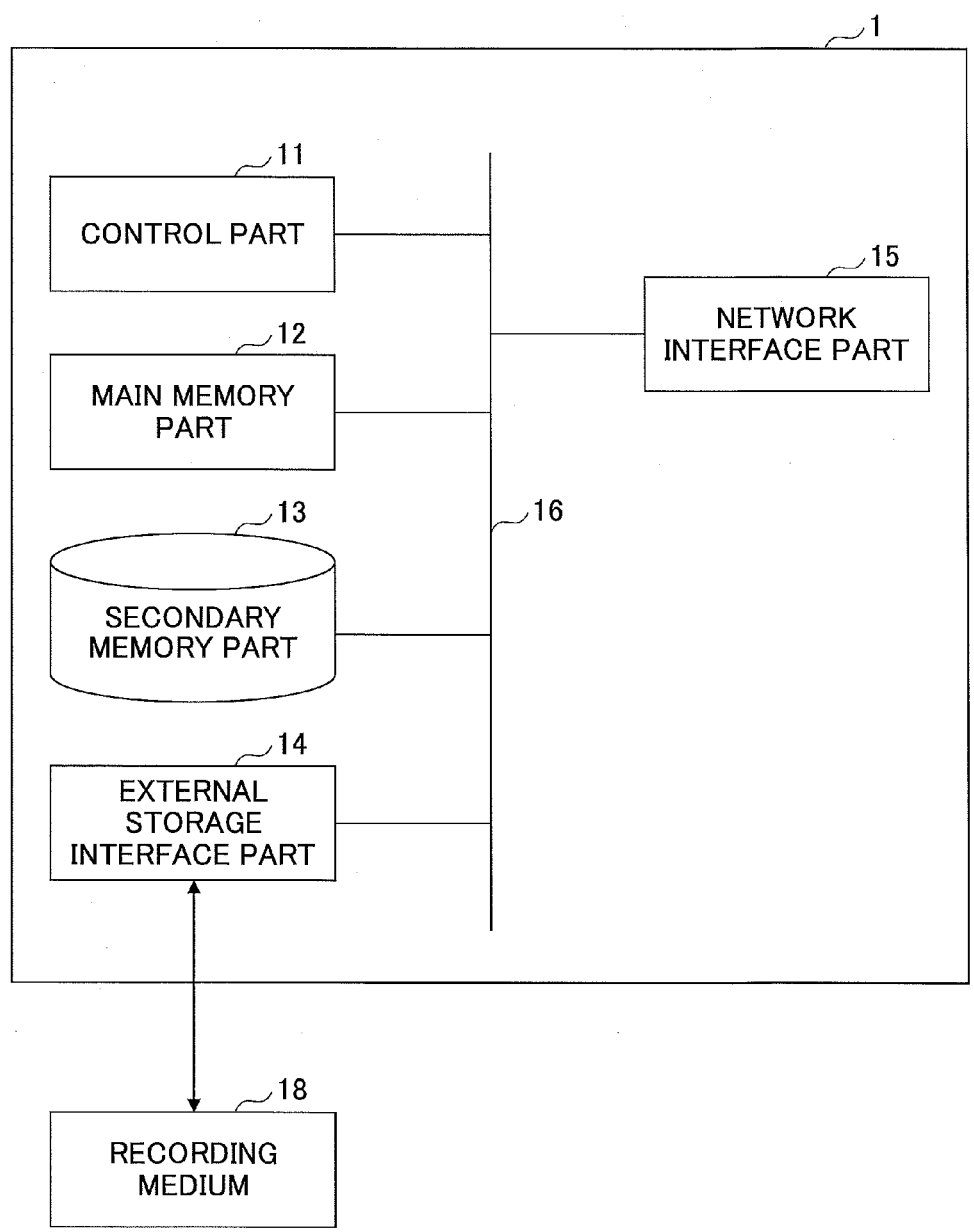
FIG. 2 is a block diagram showing the hardware composition of a device management device of a first embodiment of the present disclosure.

FIG. 2 is a block diagram showing the hardware composition of the device management device 1 of the first embodiment. As shown in FIG. 2, the information processing device 1 is constructed to include a control part 11, a main memory part 12, a secondary memory part 13, an external storage interface part 14, and a network interface part 15. These component parts are interconnected by a bus 16, and transmission and reception of data between two of these component parts may be performed through the bus 16.

The control part 11 is a CPU that controls respective parts of a computer and performs computations and processing of data in the computer. The control part 11 is a processing unit that executes a program stored in the main memory part 12, receives data from an input unit or a memory part, and performs computation or processing of the data so that the computed or processed data is output to an output unit or a memory part.

The main memory part 12 includes a ROM (read only memory), a RAM (random access memory), etc. The main memory part 12 is a storage device that stores or temporarily stores the programs (an operating system (OS), application programs, etc. which are executed by the control part 11) and data relevant to the programs.

The secondary memory part 13 is, for example, a HDD (hard disk drive). The secondary memory part 13 is a storage device that stores data relevant to the application programs, etc.

The external storage interface part 14 is an interface part between the device management device 1 and a recording medium 18 (for example, a flash memory) which is connected via a data transmission path, such as USB (universal serial bus).

A predetermined program may be stored in the recording medium 18. The predetermined program stored in the recording medium 18 may be installed in the device management device 1 through the external storage interface part 14. The predetermined program may be executable in the device management device 1.

The network interface part 15 is an interface part between the device management device 1 and a peripheral device having a communication function. The peripheral device is connected to the device management device 1 via a network, such as a LAN (local area network) or a WAN (wide area network), which is constructed with data transmission paths, such as wired or wireless transmission paths.

The device management device 1 may be constructed to include an input unit or a display unit. For example, the input unit includes a keyboard with cursor keys, numeric keys, function keys, etc., and a mouse for performing selection of a button key on a screen of the display unit. The input unit is a user interface for allowing a user to input data or enter operational instructions to the control part 11.

The display unit is formed of a CRT (cathode ray tube) or a LCD (liquid crystal display), and performs displaying of an image on a display monitor in accordance with the display data received from the control part 11.

The hardware composition of the asset management device 2 in FIG. 1 is essentially the same as that of the device management device 1 in FIG. 2, and a description thereof will be omitted.

Figure 3:
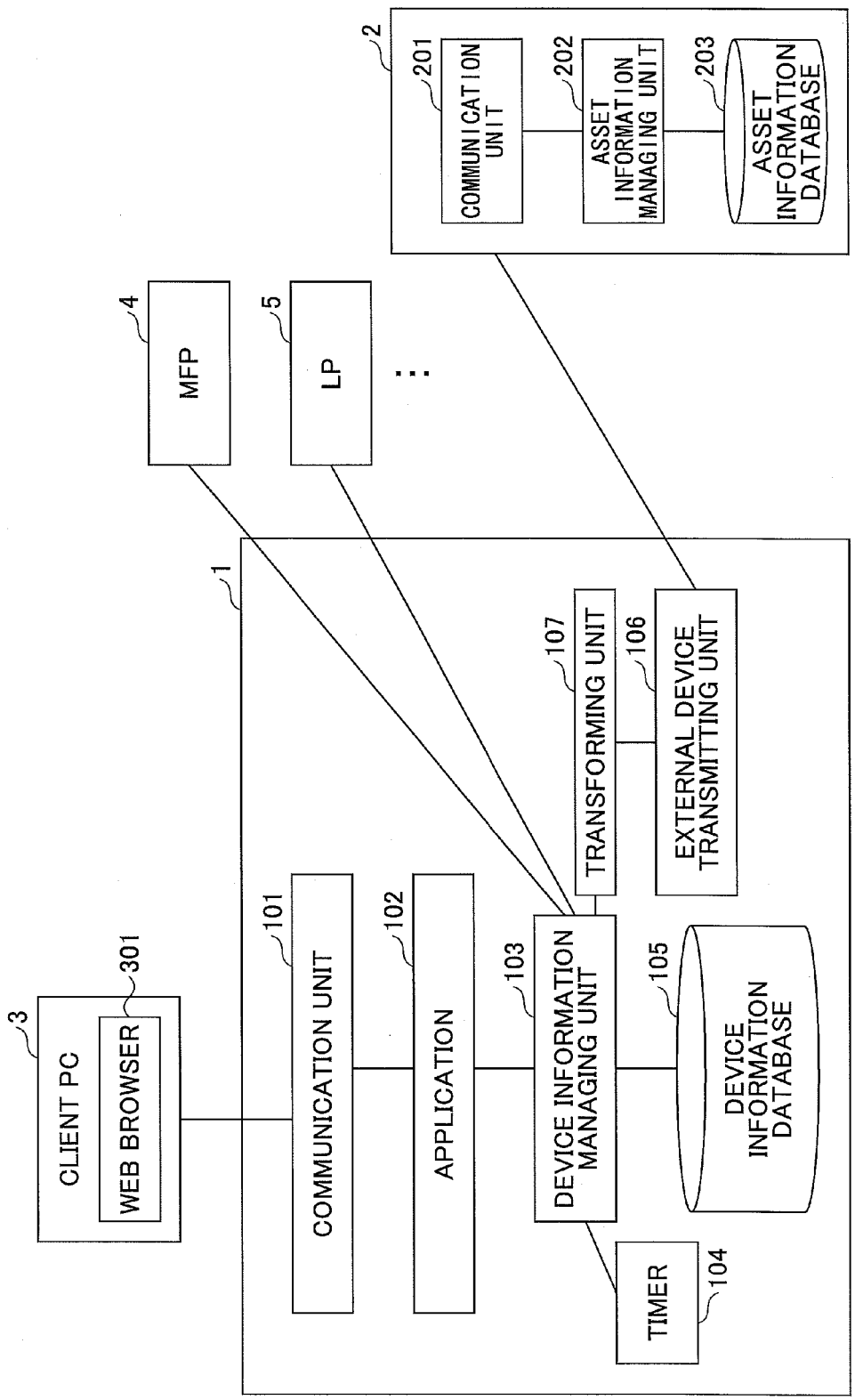
FIG. 3 is a block diagram showing the functional composition of the device management device of the first embodiment.

FIG. 3 is a block diagram showing the functional composition of the device management device 1 of the first embodiment.

As shown in FIG. 3, the client PC 3 is constructed to include a web browser 301. The web browser 301 displays a UI (user interface) of the device management device 1 and receives information from the device management device 1 via the network.

The device management device 1 is constructed to include a communication unit 101, an application 102, a device information managing unit 103, a timer 104, a device information database 105, and an external device transmitting unit 106.

The communication unit 101 transmits information to the client PC 3 and receives information from the client PC 3 via the network. The communication unit 101 is, for example, a httpd (hypertext transfer protocol daemon).

The application 102 generates a UI (user interface) by executing a device information managing program which is equivalent to the device information managing unit 103. Furthermore, the application 102 transmits the information which is input by a user using the UI, to the device information managing unit 103 (or the device information managing program).

The device information managing unit 103 detects at least one of IMACD events of the devices connected to the network by using, for example, the SNMP (Simple Network Management Protocol). The details of the device information managing unit 103 will be described with reference to FIG. 4.

Figure 4:
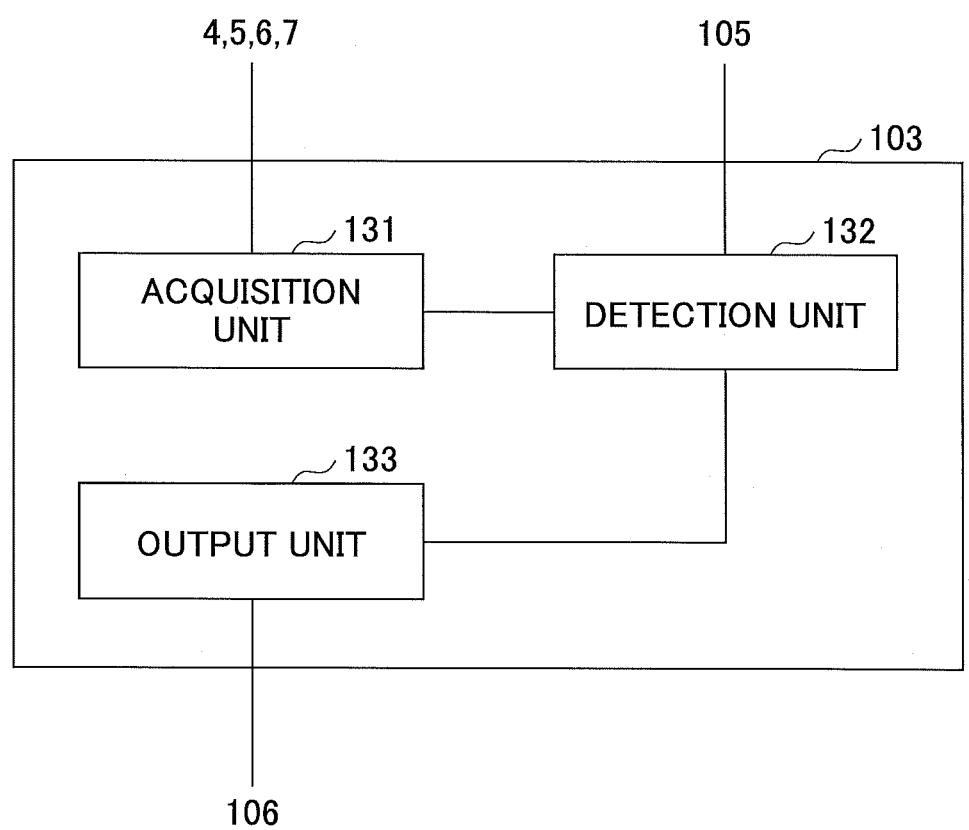
FIG. 4 is a block diagram showing the functional composition of a device information managing unit in the device management device of the first embodiment.

FIG. 4 is a block diagram showing the functional composition of the device information managing unit 103. As shown in FIG. 4, the device information managing unit 103 is constructed to include an acquisition unit 131, a detection unit 132, and an output unit 133.

The acquisition unit 131 acquires device information from the image forming devices, such as the MFP 4 or the LP 5, which are connected to the network, by using a communication protocol specific to each image forming device. The acquisition unit 131 outputs the acquired device information to the detection unit 132. The communication protocols specific to the image forming devices are, for example, SOAP (simple object access protocol) and private SNMP (simple network management protocol).

The detection unit 132 compares the acquired device information output from the acquisition unit 131 with device information stored in the device information database 105 which will be described below. Based on the result of the comparison, the detection unit 132 detects at least one of events of new installation (Install), movement (Move), addition (Add), change (Change), and disposal (Disposal) of the image forming devices connected to the network. Only when no change is contained in the device information received from a certain image forming device (an MFP, an LP, etc.) connected to the network, the detection unit 132 detects none of the IMACD events of the device.

The detection unit 132 outputs the device information corresponding to a detected event, and the identification information that identifies the image forming device as the object of the detected event, to the output unit 133. For example, the identification information is a serial number of the image forming device as the object of the detected event.

The detection unit 132 may be configured to extract the information used for asset management from the device information output from the acquisition unit 131, and to perform the comparison process of the extracted information. In this case, performance of unnecessary processes may be omitted.

The device information may also contain the status information of an image forming device and the number of printing sheets.

The output unit 133 outputs the device information and the identification information, received from the detection unit 132, to the external device transmitting unit 106.

Referring back to FIG. 3, when generating date/time information as additional information of IMACD events, the timer 104 acquires a present date/time from the device management device 1. The device information database 105 stores the device information received from the image forming devices connected to the network, such as the MFP 4 or the LP 5. The device information database 105 may be arranged outside the device management device 1.

FIG. 5 is a diagram showing an example of the device information stored in the device information database 105. As shown in FIG. 5, the device information contains device basic information (the block (A) in FIG. 5), option information (the block (B) in FIG. 5), application information (the block (C) in FIG. 5), setup information (the block (D) in FIG. 5), and firmware information (the block (E) in FIG. 5).

Among the device information shown in FIG. 5, the option information, the application information, the setup information, and the firmware information are information specific to the image forming device of concern which can be received by communicating with the image forming device using a communication protocol specific to the image forming device.

The block (A) in FIG. 5 shows an example of the device basic information. In the block (A) in FIG. 5, the device basic information contains items of device ID, MAC address, model name, serial number, IP address, place information, first discovery date/time, option ID, application ID, setting ID, firmware ID, and disposal date/time.

When a change in an IP address of the device in the IP address item among the device basic information items as in the block (A) of FIG. 5 is detected, the detection unit 132 detects a movement event in which the device has been moved. The device information corresponding to the detected movement event and the serial number that identifies the device are transmitted to the asset management device 2 through the external device transmitting unit 106. In this example, the device information corresponding to the detected movement event is the IP address for the IP address item.

When a change in place information of the device in the place information item among the device basic information items as in the block (A) of FIG. 5 is detected, the detection unit 132 detects a movement event that the device has been moved. The serial number that identifies the device and the device information corresponding to the detected movement event are transmitted to the asset management device 2 or another external device through the external device transmitting unit 106. In this example, the device information corresponding to the detected movement event is the place information for the place information item.

When a new device on the network has been detected for the first time, the detection unit 132 detects a new installation event that the device has been newly installed on the network. A serial number that identifies the new device and the device information corresponding to the detected new installation event are transmitted to the asset management device 2 through the external device transmitting unit 106. In this example, the device information corresponding to the detected new installation event is a first discovery date/time of the device for the first discovery date/time item among the device basic information items as in the block (A) of FIG. 5.

When addition of an option ID is detected, the detection unit 132 detects an addition event that an option has been newly added to the device. The serial number that identifies the device and the device information corresponding to the detected addition event are transmitted to the asset management device 2 through the external device transmitting unit 106. In this example, the device information corresponding to the detected addition event is option ID is an option ID for the option ID item among the device basic information items as in the block (A) of FIG. 5.

When addition of an application ID is detected, the detection unit 132 detects an addition event that an application has been newly added to the device. The serial number that identifies the device and the device information corresponding to the detected addition event are transmitted to the asset management device 2 through the external device transmitting unit 106. In this example, the device information corresponding to the detected addition event is an application ID of the application for the application ID item among the device basic information items as in the block (A) of FIG. 5.

When a change in a setup name or setup value corresponding to setting information of a setting ID is detected, the detection unit 132 detects a change event that the setup name or setup value has been changed. The serial number that identifies the device and the device information corresponding to the detected change event are transmitted to the asset management device 2 through the external device transmitting unit 106. In this example, the device information corresponding to the detected change event is the changed setup name or setup value in the setting information of the setting ID for the setting ID item among the device basic information items as in the block (A) of FIG. 5.

When a change in a firmware version corresponding to a firmware of a firmware ID is detected, the detection unit 132 detects a change event that the version of the firmware of the firmware ID has been changed. The serial number that identifies the device and the device information corresponding to the detected change event are transmitted to the asset management device 2 through the external device transmitting unit 106. In this example, the device information corresponding to the detected change event is the changed firmware version of the firmware of the firmware ID for the firmware ID item among the device basic information items as in the block (A) of FIG. 5.

When it is impossible to detect a certain device on the network, the detection unit 132 detects a disposal event that the device has been discarded from the network. The serial number that identifies the device and the device information corresponding to the detected disposal event are transmitted to the asset management device 2 through the external device transmitting unit 106. In this example, the device information corresponding to the detected disposal event is a disposal date/time of the device for the disposal date/time item among the device basic information items as in the block (A) of FIG. 5.

Referring back to FIG. 3, the external device transmitting unit 106 transmits the serial number that identifies the device and the device information corresponding to the detected event to the asset management device 2 when one of the IMACD events of the devices is detected by the device information managing unit 103. The external device transmitting unit 106 transmits such information to the asset management device 2 by using, for example, the http POST command or PUT command.

Before the above information is transmitted by the external device transmitting unit 106 at this time, the transforming unit 107 transforms the above information into data in a data format that enables the asset management device 2 at the transmission destination to manage the data. Specifically, prior to the transmission of the above information, the transforming unit 107 transforms the above information (to be transmitted by the external device transmitting unit 106) into data in the data format that enables the asset management device 2 at the transmission destination to manage the data. For example, the transforming process performed by the transforming unit 107 may be rearrangement of data, changing of keywords, conversion of data format, etc.

Alternatively, the external device transmitting unit 106 may be arranged to perform both the transforming process by the transforming unit 107 and the transmission process to transmit the resulting data from the transforming unit 107 to the asset management device 2.

Next, the asset management device 2 will be described. As shown in FIG. 3, the asset management device 2 is constructed to include a communication unit 201, an asset information managing unit 202, and an asset information database 203.

In the first embodiment, the asset management device 2 is arranged outside the device management device 1, and may be considered as an external device of the device management device 1. Alternatively, the device management device and the asset management device may be considered as an integral management device on the network.

As shown in FIG. 3, the communication unit 201 receives, from the external device transmitting unit 106, the information of the IMACD event and the identification information of the device in the predetermined data format. The communication unit 201 outputs the received information to the asset information managing unit 202.

The asset information managing unit 202 manages the devices on the network as assets. The asset information managing unit 202 controls the input of setup items of each device as the asset. The asset information managing unit 202 specifies a device based on the identification information of the device received from the communication unit 201, and updates the asset information of the device in the asset information database 203 in accordance with the information of the IMACD event received from the communication unit 201.

The asset information database 203 is a database which manages information of the devices, such as PCs, software modules, MFPs or LPs, as the assets. Alternatively, the asset information database 203 may be arranged outside the asset management device 2.

FIG. 6 is a diagram showing an example of asset information stored in the asset information database. In the example shown in FIG. 6, the asset information contains a serial number of each device, a purchase date, an installation date, a purchase price, a person in charge, a place, . . . , a disposal date/time. The asset information contains the information of IMACD events of the devices on the network. The asset information stored in the asset information database is updated by the asset information managing unit 202.

For example, the above-described functions of the communication unit 101 and the external device transmitting unit 106 in the first embodiment may be performed by the control part 11, the main memory part 12, and the network interface part 15, and the above-described function of the device information database 105 may be performed by the secondary memory part 13. For example, the above-described functions of the application 102, the device information managing unit 103, and the timer 104 may be performed by the control part 11 and the main memory part 12 used as the work memory of the control part 11.

For example, the above-described functions of the device information managing unit 103 may be performed by a computer (or the CPU of the control part 11) in accordance with a device-implemented device information managing program when executed by the computer, and the above-described functions of the external device transmitting unit 106 may be performed by a computer (or the CPU of the control part 11) in accordance with a device-implemented external device transmitting program when executed by the computer. Alternatively, the device information managing program and the external device transmitting program may be described in a single program and implemented in the device management device according to the present disclosure.

Next, the information transforming process performed by the transforming unit 107 will be described. In order to simplify the description, the device information stored in the device information database 105 is simplified, and the information transforming process will be described.

FIG. 7 is a diagram showing an example of the device basic information. As shown in FIG. 7, the device basic information contains items of serial number, IP address, model name, and option ID. FIG. 8 is a diagram showing an example of the option information. As shown in FIG. 8, the option information contains items of option ID, option name, and option version.

It is assumed that the device information managing unit 103 has detected a new installation event of the device connected to the networks. In this case, the device information managing unit 103 registers the device information of the device the new installation of which has been detected, into the device information database 105, and outputs the device information to the transforming unit 107.

FIG. 9 is a diagram showing an example of a data structure of the information transmitted to the transforming unit 107. As shown in FIG. 9, the device information managing unit 103 transmits the source data values of the device information to the transforming unit 107.

FIG. 10 is a diagram showing an example of a data structure of the information transmitted to the asset management device 2. As shown in FIG. 10, the information shown in FIG. 9 is transformed into data in an XML (extensible markup language) form that enables the asset management device to manage the received data (the information shown in FIG. 10) as the asset information. In this respect, what kind of data format can be managed by the asset management device is predetermined by a developer of the asset management device.

The transforming unit 107 of this embodiment is configured to receive the information as shown in FIG. 9, and to transform the received information into the information as shown in FIG. 10, in order to transmit the resulting information to the asset management device 2. Thereby, the data communication between the device management device 1 and the asset management device 2 can be carried out.

When the data format of data that can be managed by the asset management device 2 is changed, the data format of data that is output from the transforming unit 107 must be changed accordingly. Furthermore, when the device management device 1 is connected to a plurality of asset management devices dealing with different data formats, the device management device 1 may be constructed to include a number of transforming units corresponding to the respective data formats of the asset management devices. For example, the different data formats may include data formats in which the characters of the tags are different from those in the data format of the information shown in FIG. 10, or the sequence of the tags is different from that in the data format of the information shown in FIG. 10, or the programming language is different from that in the data format of the information shown in FIG. 10.

It is assumed that the device information managing unit 103 has detected addition of an option. For example, it is assumed that, when the device information is received from the device with the serial number "123" as shown in FIG. 7, an option ID "3" has been added. In this case, the device information managing unit 103 compares the device information received from the device (for example, MFP) with the serial number "123" with the device information of the serial number "123" stored in the device information database 105, and detects the addition of the option ID "3".

At this time, the device information managing unit 103 acquires the option information of the option ID "3" from the option information stored in the device information database 105 (FIG. 8). Next, the device information managing unit 103 outputs the serial number "123" of the device concerned and the option information of the option ID "3" to the transforming unit 107.

In this case, the transforming unit 107 transforms the serial number and the option information, received from the device information managing unit 103, into the data in the data format as in FIG. 10. The external device transmitting unit 106 transmits the transformed information to the asset management device 2 by using the http.

Similarly, when the device information managing unit 103 detects the events of movement, change and disposal, the transforming unit 107 performs the same processing as in the above-described examples, and the external device transmitting unit 106 transmits the transformed information to the asset management device 2.

Figure 11:
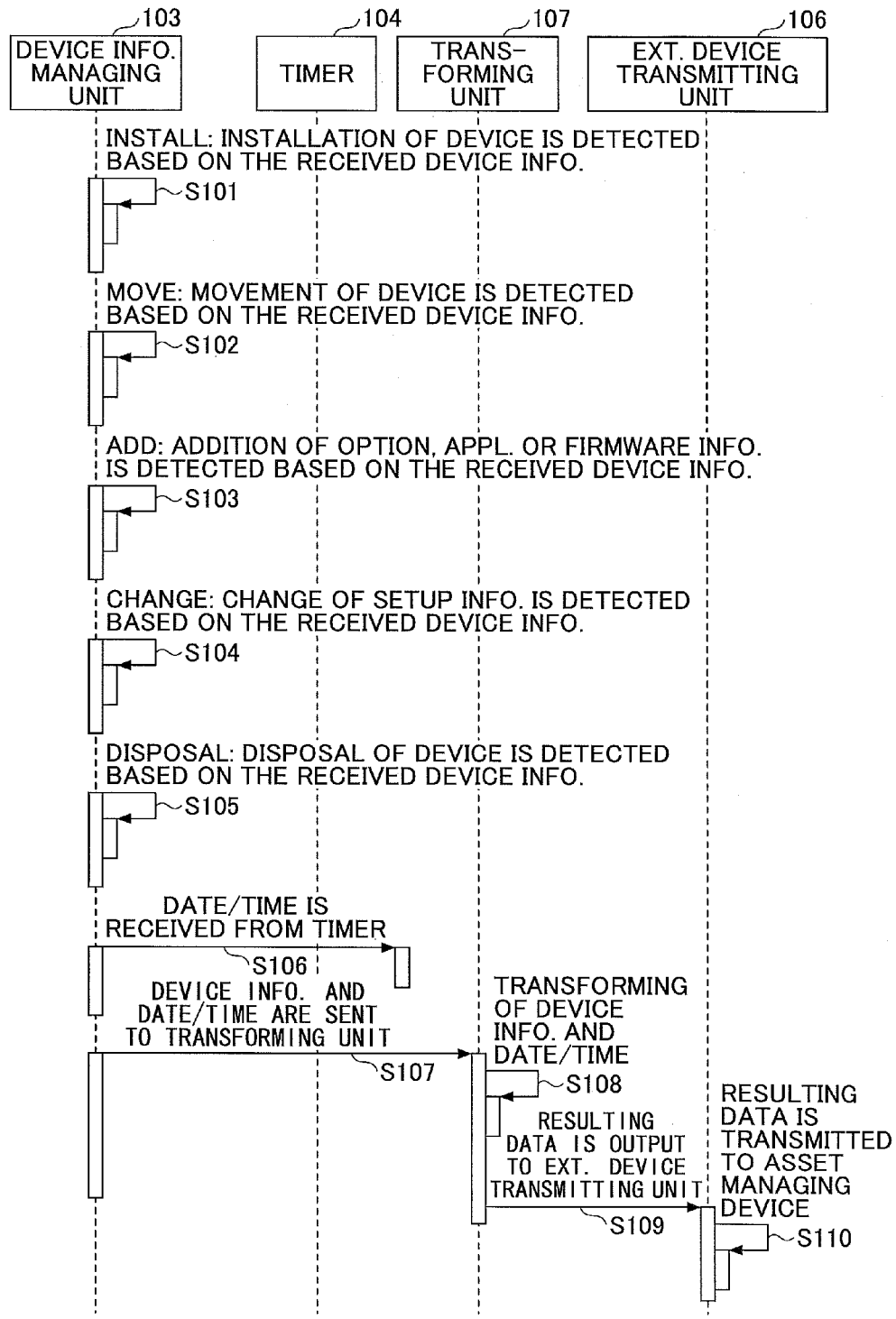
FIG. 11 is a flowchart for explaining a process of detection of IMACD events performed by the device management device of the first embodiment.

Next, a process of detection of IMACD events performed by the device management device 1 will be described. FIG. 11 is a flowchart for explaining the process of detection of IMACD events performed by the device management device 1.

As shown in FIG. 11, at step S101, the device information managing unit 103 checks new installation of a device. The device information managing unit 103 periodically receives the device information from the devices connected to the network. At this time, if the device, the device information of which is not stored in the device information database 105, is detected, the device information managing unit 103 detects the new installation event of the device.

The device information managing unit 103 transmits a request to all the IP addresses of the devices being managed, and, if a response is received from the devices, the device information managing unit 103 receives the device information from the device with the response received.

At step S102, the device information managing unit 103 checks movement of a device. The device information managing unit 103 periodically receives the device information from the devices connected to the network. At this time, if a change in the IP address of the device information of a device stored in the device information database 105 is detected, or if a change in the place information of the device information of a device is detected, the device information managing unit 103 detects the movement event of the device.

At step S103, the device information managing unit 103 checks addition of an option/application/firmware in a device. The device information managing unit 103 periodically receives the device information from the devices connected to the network. At this time, if addition of the option information, the application information, or the firmware information in the device information of a device stored in the device information database 105 is detected, the device information managing unit 103 detects the addition event of the device.

At step S104, the device information managing unit 103 checks change of setup information in a device. The device information managing unit 103 periodically receives the device information from the devices connected to the network. At this time, if a change in the setup information of the device information of a device stored in the device information database 105 is detected, the device information managing unit 103 detects the change event of the device.

At step S105, the device information managing unit 103 checks disposal of a device. The device information managing unit 103 periodically receives the device information from the devices connected to the network. At this time, if a response from a device the device information of which is stored in the device information database 105 cannot be received, or if accessing a device on the network is impossible, the device information managing unit 103 detects the disposal event of the device.

When at least one of the IMACD events is detected in the steps S101-S105, the control is transferred to step S106. At step S106, the device information managing unit 103 receives the present date/time from the timer 104.

At step S107, the device information managing unit 103 outputs both the device information received from the device the at least one of the IMACD events of which has been detected and the present date/time received from the timer 104 to the transforming unit 107.

Specifically, in the case of detection of the new installation event, the device information managing unit 103 outputs the device information received from the newly installed device and the date/time information received from the timer 104 to the transforming unit 107. At this time, the device information managing unit 103 registers the device information of the newly installed device and the received date/time information (the first discovery date/time) in the device information database 105.

In the case of detection of the movement event, the device information managing unit 103 outputs the IP address of the device information received from the moved device, the serial number of the device, and the date/time information received from the timer 104, to the transforming unit 107.

In the case of detection of the addition event, the device information managing unit 103 outputs the option information of the added option, the application information or the firmware information, the serial number of the device, and the date/time information received from the timer 104, to the transforming unit 107.

In the case of detection of the change event, the device information managing unit 103 outputs the setup information including the changed setup value, the serial number of the device, and the date/time information received from the timer 104, to the transforming unit 107.

In the case of detection of the disposal event, the device information managing unit 103 outputs the serial number of the device and the date/time information received from the timer 104 (which corresponds to the disposal date/time information) to the transforming unit 107. At this time, the device information managing unit 103 registers the date/time received from the timer 104 in the device information database 105 as the disposal date/time information.

At step S108, the transforming unit 107 transforms the information received from the device information managing unit 103 into data in the data format that enables the asset management device 2 to manage the data. For example, the transforming unit 107 performs the transforming process as follows.

In the case of detection of the new installation event, the processing unit 107 transforms the device information and the date/time information received from the device information managing unit 103 into the data in the date format that enables the asset management device 2 to manage the data.

In the case of detection of the movement event, the transforming unit 107 transforms the IP address, the serial number, and the date/time information received from the device information managing unit 103 into the data in the date format that enables the asset management device 2 to manage the data. The transforming unit 107 performs the same process in the case of detection of the movement event related to the place information.

In the case of detection of the addition event, the transforming unit 107 transforms the option information (or the application information, or the firmware information), the serial number, and the date/time information received from the device information managing unit 103 into the data in the date format that enables the asset management device 2 to manage the data.

In the case of detection of the change event, the transforming unit 107 transforms the setup information, the serial number, and the date/time information received from the device information managing unit 103 into the data in the date format that enables the asset management device 2 to manage the data. The device information managing unit 103 performs the same process in the case of detection of the change event related to the option version, the application version or the firmware version.

In the case of detection of the disposal event, the transforming unit 107 transforms the serial number and the disposal date/time information received from the device information managing unit 103 into the data in the date format that enables the asset management device 2 to manage the data. The transforming unit 107 performs the same process with respect to the event detected by the device information managing unit 103.

At step S109, the transforming unit 107 outputs the resulting data in the data format that can be managed by the asset management device 2, to the external device transmitting unit 106. At step S110, the external device transmitting unit 106 transmits the resulting data in the data format that can be managed by the asset management device 2, to the asset management device 2.

As described above, according to the first embodiment, the information used for the asset management can be transmitted to the asset management device, and the asset management device can perform efficient asset management. According to the first embodiment, by providing the program for performing the external device transmitting unit 106 which is separate from the program for performing the device information managing unit 103, the device management device can be flexibly adapted to be in conformity with a change of the data format that can be managed by the asset management device.

Moreover, according to the first embodiment, the device information managing unit 103 receives the device information by using the communication protocol specific to each of the devices, such as MFPs or LPs, on the network, and the option information and the application information specific to each device can be acquired. The device information managing unit 103 may be arranged to extract only the information used for the asset management from the received device information, and to perform the comparison process of the extracted information, and performance of unnecessary processes may be omitted.

Next, a device management device of a second embodiment of the present disclosure will be described. In the second embodiment, the device information is received from each of the MFPs or LPs which use mutually different communication protocols. The hardware composition of the device management device 1 of the second embodiment is essentially the same as that of the first embodiment shown in FIG. 2, and a description thereof will be omitted.

Figure 12:
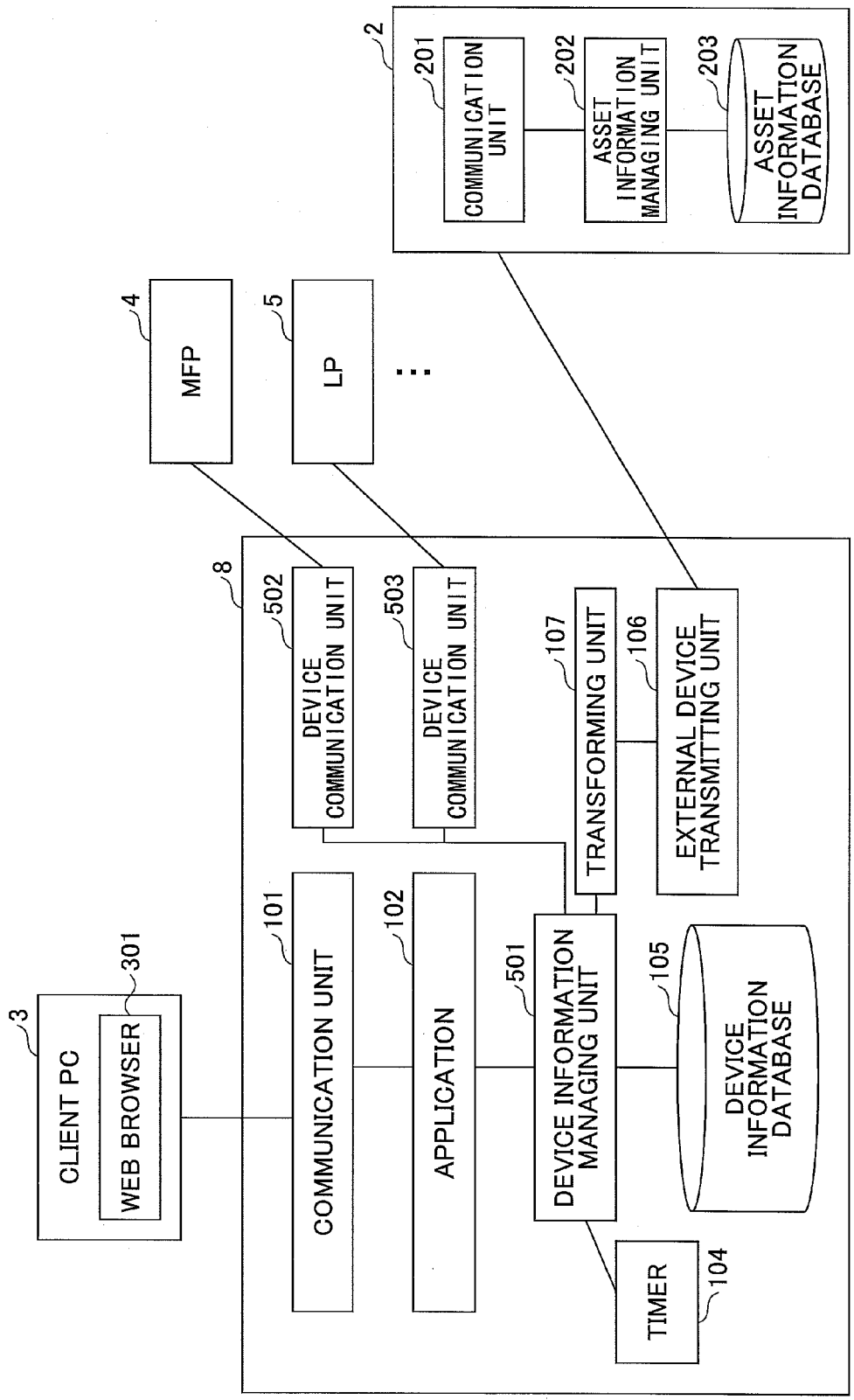
FIG. 12 is a block diagram showing the functional composition of a device management device of a second embodiment of the present disclosure.

FIG. 12 is a block diagram showing the functional composition of the device management device 1 of the second embodiment. As shown in FIG. 12, device communication units 502 and 503 are additionally provided in the device management device 1 of the first embodiment. Each of the device communication units 502 and 503 has the same function as the acquisition unit 131 shown in FIG. 4. In FIG. 12, the elements which are the same as corresponding elements in FIG. 3 are designated by the same reference numerals, and a description thereof will be omitted.

As shown in FIG. 12, a device information managing unit 501 of this embodiment selects one of the device communication units according to the communication protocol specific to the MFP from which the device information is received. The details of the device information managing unit 501 will be described with reference to FIG. 13.

Figure 13:
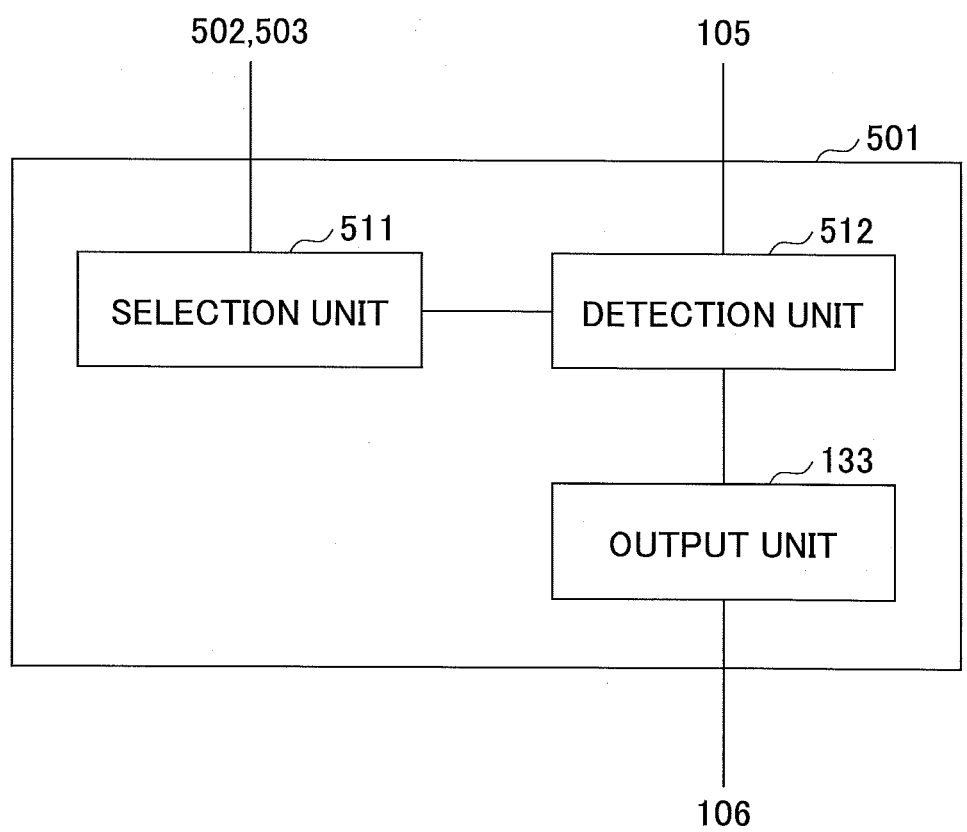
FIG. 13 is a block diagram showing the functional composition of a device information managing unit in the device management device of the second embodiment.

FIG. 13 is a block diagram showing the functional composition of a device information managing unit 501 in the device management device 1 of the second embodiment.

As shown in FIG. 13, the device information managing unit 501 is constructed to include a selection unit 511, a detection unit 512, and an output unit 133.

The selection unit 511 selects one of the device communication units 502 and 503 according to the communication protocol of the image forming device from which the device information is received. For example, when reception of device information is performed periodically, the selection unit 511 is arranged to initially perform the communication by using the device communication unit 502, and, after the communication by using the device communication unit 502 is completed, the selection unit 511 is arranged to subsequently perform the communication by using the device communication unit 503.

The detection unit 512 compares the device information received through the selection unit 511 with the device information stored in the device information database 105, and detects at least one of the IMACD events of the devices on the network. The process performed by the device management device of this embodiment after the end of the detection of the IMACD events is essentially the same as that of the first embodiment, and a description thereof will be omitted.

Referring back to FIG. 12, the device communication unit 502 and the device communication unit 503 perform respective communications with the devices (MFPs or LPs) by using the mutually different communication protocols. For example, the device communication unit 502 may be a communication unit arranged to perform communication by using the SOAP (simple object access protocol), and the device communication unit 503 may be a communication unit arranged to perform communication by using the private SNMP (simple network management protocol). The MFPs and the LPs that perform communication by using the SOAP communicate with the device communication unit 502, while the MFPs and the LPs that perform communication by using the private SNMP communicate with the device communication unit 503.

In this case, if an MFP or LP that performs communication by using the private SNMP is a device of another manufacturer and the private SNMP is unknown, it is difficult to receive the device information from the MFP or LP. However, there is a tool of a third party vendor for analyzing the communication protocol specific to such a manufacturer and enabling the device management device to communicate with the MFP or LP. For example, the communication protocol specific to the manufacturer is the private SNMP. If the above-described tool is used, the device communication unit 503 is allowed to perform the communication with the MFP or LP.

The device information database 105 may be arranged to additionally set the address information of the private SNMP. If the address information of the private SNMP is added, it is possible to acquire the device information of the MFP or LP by accessing the device information database 105 at the address corresponding to the address information.

The process performed by the device management device of the second embodiment after reception of the device information from the MFPs and LPs on the network is completed is essentially the same as that of the first embodiment, and a description thereof will be omitted.

For example, the above-described functions of the device communication units 502 and 503 in the second embodiment may be performed by the control part 11, the main memory part 12, and the network interface part 15. The above-described functions of the device communication units 502 and 503 may be performed by a computer (or the CPU of the control part 11) in accordance with a device-implemented device communication program when executed by the computer. This device communication program may be described in a program file separate from a program file of the device information managing program.

As described above, according to the second embodiment, even when the MFPs and LPs using the mutually different communication protocols exist in the network, the device information can be received from each of the MFPs and LPs. According to the second embodiment, by providing the device communication program for performing the functions of the device communication unit which is separate from the device information managing program, the device management device can be flexibly adapted to be in conformity with the MFPs and LPs which perform respective communication by using their specific communication protocols.

In a modification of the foregoing embodiments, the device management device may be arranged to reduce the loads of the device management device. In this modification, when the device information is received, the device management device transforms the device information into data in the data format that can be managed by the asset management device, and transmits the resulting data to the asset management device. Then, the asset management device compares the received device information with the device information of a corresponding device stored in the asset information database, and detects at least one of the IMACD events of the device. The asset management device updates the asset information by using the information related to the detected event.

If the detection of the IMACD events is performed by the asset management device, the device management device of this modification may be arranged to transform the received device information and transmit the resulting data to the asset management device. Accordingly, it is possible to reduce the loads of the device management device.

As described in the foregoing, in the device management device according to the present disclosure, the information used for asset management can be transmitted to the asset management device, and the asset management device is allowed to perform efficient asset management.

The present disclosure is not limited to the specifically disclosed embodiments, and variations and modifications may be made without departing from the scope of the present disclosure.

What is claimed is:

1. A device management apparatus connected to a device and an asset management device via a network, the device management apparatus comprising a processor that executes steps of:
    acquiring a device information of the device via the network in accordance with a communication protocol that suits for the device;
    detecting at least one event concerning installation, movement, addition, change, or disposal with respect to the device based on the acquired information and internal information stored in the device management apparatus;
    transforming both identification information of the device and device information corresponding to the one of the events detected into data that enables the asset management device to manage the data; and
    transmitting transformed data to the asset management device via the network.

2. The device management apparatus according to claim 1, wherein the steps include comparing the acquired device information with device information stored in the device management apparatus.

3. The device management apparatus according to claim 2, wherein the steps include detecting the one of the events based on a result of the step of comparing.

4. The device management apparatus according to claim 3, wherein the steps include further storing device information that has been previously acquired, and comparing acquired device information that has been previously acquired with the acquired device information.

5. The device management apparatus according to claim 1, wherein the steps include generating date/time information and adding the date/time information to one of the installation, movement, addition, change, and disposal events.

6. The device management apparatus according to claim 1, wherein the steps include detecting the one of the events based on at least one of device ID, MAC address, model name, serial number, IP address, place information, discovery date/time, option ID, application ID, setting ID, firmware ID, and disposal date/time.

7. An asset management device connected to a device management apparatus via a network, the asset management apparatus comprising a processor that executes steps of;
    acquiring from the device management device via the network, at least one of installation, movement, addition, change, and disposal events with respect to one of the devices and identification information of the one of the devices;
    updating asset information of asset registered in the asset management device according to the device information items corresponding to the at least one event and the identification information of the one of the devices, and
    managing updated asset information.

8. A system comprising:
    a first processor implemented on a device management apparatus connected to a device and an asset management device via a network, and
    a second processor implemented on a asset management apparatus connected to a device management apparatus via a network, wherein the first processor executes steps of:
  acquiring a device information of the device via the network in accordance with a communication protocol that suits for the device;
  detecting at least one of events about installation, movement, addition, change, and disposal with respect to the device based on the acquired information and internal information stored in the device management apparatus;
  transforming both identification information of the device and device information corresponding to the one of the events detected into data that enables the asset management device to manage the data; and
  transmitting transformed data to the asset management device via the network,
wherein the second processor executes steps of:
  acquiring from the device management device via the network, at least one of installation, movement, addition, change, and disposal events with respect to one of the devices and identification information of the one of the devices;
  updating asset information of asset registered in the asset management device according to the device information items corresponding to the at least one event and the identification information of the one of the devices, and
  managing updated asset information.

* * * * *